April 13, 1926.

G. RAMSEY 1,580,327

SHOCK ABSORBER FOR AUTOMOBILES AND THE LIKE

Filed Nov. 21, 1919   4 Sheets-Sheet 1

Inventor
George Ramsey

April 13, 1926.

G. RAMSEY 1,580,327

SHOCK ABSORBER FOR AUTOMOBILES AND THE LIKE

Filed Nov. 21, 1919     4 Sheets-Sheet 4

Inventor
George Ramsey

Patented Apr. 13, 1926.

1,580,327

UNITED STATES PATENT OFFICE.

GEORGE RAMSEY, OF BROOKLYN, NEW YORK, ASSIGNOR TO SELF-FEEDING VAPORIZER CORPORATION, OF NEW YORK, N. Y., A CORPORATION OF NEW YORK.

SHOCK ABSORBER FOR AUTOMOBILES AND THE LIKE.

Application filed November 21, 1919. Serial No. 339,669.

*To all whom it may concern:*

Be it known that I, GEORGE RAMSEY, a citizen of the United States, residing at Brooklyn, in the county of Kings, State of New York, have invented certain new and useful Improvements in Shock Absorbers for Automobiles and the like, of which the following is a specification.

This invention relates broadly to shock absorbing devices and more especially to a shock absorbing device for automobiles.

The principal object of the present invention is to provide a shock absorbing system to absorb vibration transmitted through the propulsion mechanism.

Another object of the present invention is a shock absorbing construction adapted primarily for automobiles driven by hydrocarbon engines and the like wherein intermittent impulses to the road wheels are absorbed and transmitted as substantially constant forces.

Another and important object of the present invention is a shock absorber mounted in the line of transmission between the source of power and the drive wheels in such manner that torsional vibrations set up in the drive mechanism, due to an uneven roadway, are absorbed and not transmitted through the source of power to the vehicle body.

Another and important object of the present invention is a shock absorbing system for automobiles and the like wherein vertical vibrations of the chassis frame relative to the road wheels is not transmitted through the propulsion system to the road wheels.

More specifically, the object of the present invention is to provide a shock absorbing system comprising a friction vibration absorbing device mounted in the line of transmission between the source of power and the drive wheels in such manner that vibration in the propulsion shaft is absorbed.

A still further object of the present invention is the provision of a friction shock absorbing device cooperative with the suspension springs on the body of an automobile or the like and wherein the shock absorbing members in the propulsion mechanism absorb driving shock stresses which occur between the road wheels and the source of power and which may be otherwise brought about by vibration of the vehicle body relatively to the drive wheels.

Still more specifically, the present invention relates to providing a friction shock absorbing system, as specified and wherein the resistance of the system increases as the torque on the propeller shaft increases in such manner that it is impossible to reach the limit of efficiency of the shock absorbing device.

This invention possesses many other and advantageous features, some of which, together with the foregoing, will be set out more at length in the following description wherein will be outlined in full that form of the invention which I have selected for illustration in the drawings accompanying and forming a part of the present specification.

In the drawings and specification I have described only the preferred form of my generic invention. It is to be understood that I do not limit myself to such form, because my invention may be embodied in a multiplicity of forms, it being understood by the claims succeeding the description of my invention that I desire to cover the invention in whatsoever form it may be embodied or practiced.

Referring now to the drawings, wherein like parts are designated by like characters throughout the several figures thereof, Figure 1 is a more or less diagramatic illustration of propulsion and suspension devices of an automobile in which my invention is included;

Figure 1:
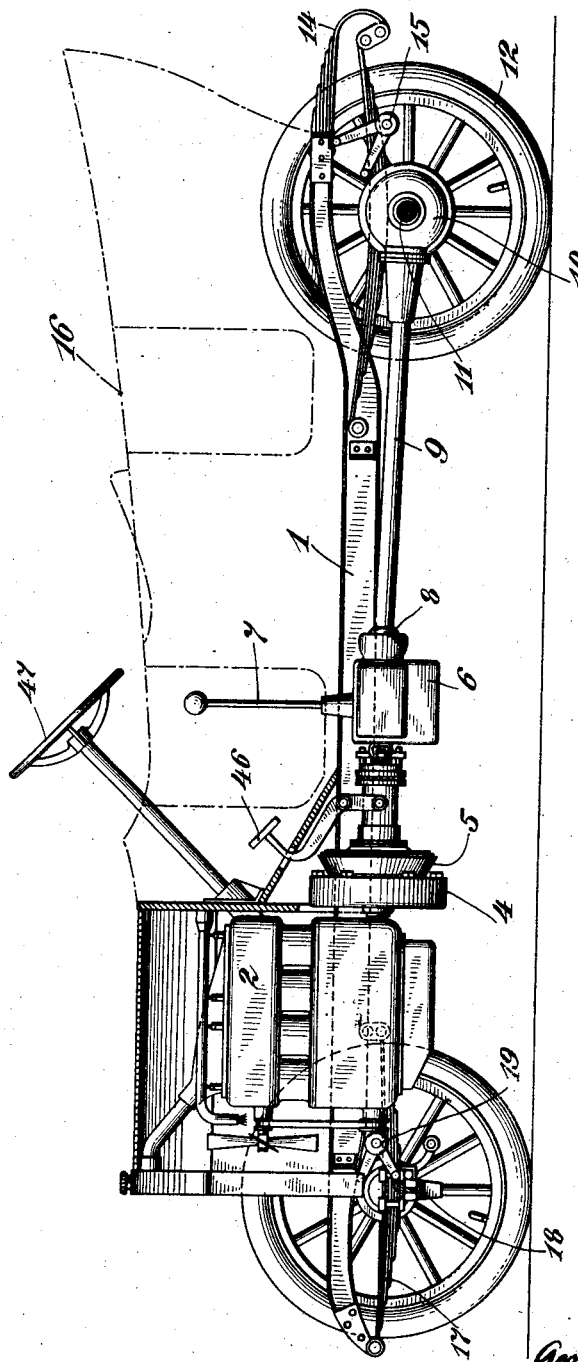

Heretofore in the art of automobiles and the like, shock-absorbers have been proposed between the vehicle body and the road wheel support in such manner as to absorb vehicle vibrations due to the unevenness of the roadway and connections between the road wheels and the vehicle body. In the prior use of such shock absorbing devices the vehicle has been treated as functioning in the same manner as the ordinary horse-drawn buggy, and without reference to the fact that there is a connection directly between the drive wheels and the vehicle body through the propulsion shaft. In an automobile the vertical movement of the body, on the body springs, relative to the road wheels causes an arcuate movement of the propulsion shaft which is translated into horizontal vibration when the ordinary clutch is "in". When the clutch is set, or "in", the propulsion shaft is not free to turn, consequently the up-and-down movement of the front end of the shaft causes the shaft to act as a lever which turns the road wheel shafts forwardly when the front end of the propulsion shaft descends, and turns these shafts backwardly when it rises, thus producing an oscillatory movement in the road wheel shafts when there is a relative vertical movement between the road wheels and the chassis frame or body. Therefore any suspended automobile body, even if the suspension be so perfect as to absorb direct vertical shocks, will nevertheless be subject to considerable vibration when running over an uneven roadway due to this leverage action of the propulsion shaft, and vibration thus produced is particularly uncomfortable because it is a horizontal vibration. There is also a vertical vibration set up due to the propeller shaft connection. The vertical vibration is primarily caused when running over rough roads by the tendency of the road wheels to either slow down or speed up, relative to the speed of the engine. When the road wheels tend to run faster than the speed of the engine, as where the wheel is dropping off of a bump, there is a pull downwardly on the forward end of the propeller shaft, and this pulls the body down on the body springs. Where the road wheels encounter unusual resistance, as climbing over a ridge, the pull of the engine causes a tendency for the gear of the propeller shaft to roll up on the driven gear and therefore a lift is produced upon the forward end of the propeller shaft. This upward thrust of course tends to lift the body from the road wheels. These combined movements through the propeller shaft establish vibrations which cannot be absorbed by the body suspension springs acting alone, as in horse-drawn vehicles.

Hydro-carbon engines are explosive engines, and the power impulses are intermittent. These power impulses are transmitted in a certain degree as intermittent forces. These intermittent forces cause horizontal and vertical vibrations due partly to the action previously specified and partly to the intermittent character of the power itself.

I am aware that spring couplers have been inserted in the propeller shafts of automobile construction. Spring couplers, however, are not shock-absorbers but act as storehouses for the energy received and transmit shocks which are delivered to the coupler. Furthermore, a spring coupler tends to change the back pressure or torque on the crank shaft of the engine in such manner as to interfere with the timing mechanism and other operating features of the engine. Spring couplers in some cases accentuate rather than alleviate the conditions specified, and therefore spring couplers have not proved successful in solving the problems above outlined.

The present invention overcomes the difficulties of the known art by providing a shock-absorber wherein vibration is completely absorbed within the shock-absorber itself, by being transformed into heat and then dissipated or otherwise eliminated. This may be done by a friction shock-absorber, or by air cushions comprising radially operated pistons, or otherwise. In the preferred form springs are utilized to establish a normal zone of operations for the device and the friction elements establish a neutral zone so that it will be noted that any vibration, the energy of which lies between the extreme limits of the neutral zones, will be absorbed by friction. This fact is more clearly shown by reference to Figures 5, 6 and 7.

Referring now to the drawings, and more especially to Figure 1, which diagrammatically illustrates an automobile chassis and propulsion system, the chassis frame 1 carries a prime mover 2, which may comprise a suitable hydrocarbon engine or other power plant, and which may be provided with a flywheel 4, and connected to a suitable clutch 5. Where the range of control of the power system is not sufficient to obtain the desired range of speeds, a gear box 6 is commonly provided, which comprises an arrangement carrying the desired gearing and these gears are usually controlled by a control lever 7. A propulsion shaft is generally connected by means of a universal joint connection 8, with the prime mover, and where a gear set is used, the universal joint is usually adjacent the gear box, as is illustrated in Figure 1. This propulsion shaft usually extends through a casing or sheath 9 and terminates in a gear meshing with a differential drive gear within the housing 10. The differential gear connects the road-wheel shafts 11 in such manner that power is transmitted directly to the driving road-wheels 12. Suitable rear springs 14 connect the rear axle with the chassis frame in the manner that is well known in the art in order to facilitate absorption of shocks which may not be completely absorbed by the road-wheels 12 that are mounted upon the driving shafts. Preferably suitable friction shock-absorbers 15 are mounted between the rear axle construction and rear portion of the chassis to absorb and prevent undesirable vibration which might not be fully taken up by the inertia of the chassis and automobile body 16. Suitable spring suspension members 17 likewise connect the front axles 18 with the front end of the chassis frame and preferably friction shock-absorbers 19 are disposed between the front axle and the front end of the chassis body to absorb undue vibration in the same manner in which the rear absorbers 15 act. The constructions which have previously been generally described are mechanical devices well known in the automobile art and it is believed to be unnecessary, to enable one skilled in the art to practice the present invention, to go into details in connection with such mechanical parts.

Figure 2:
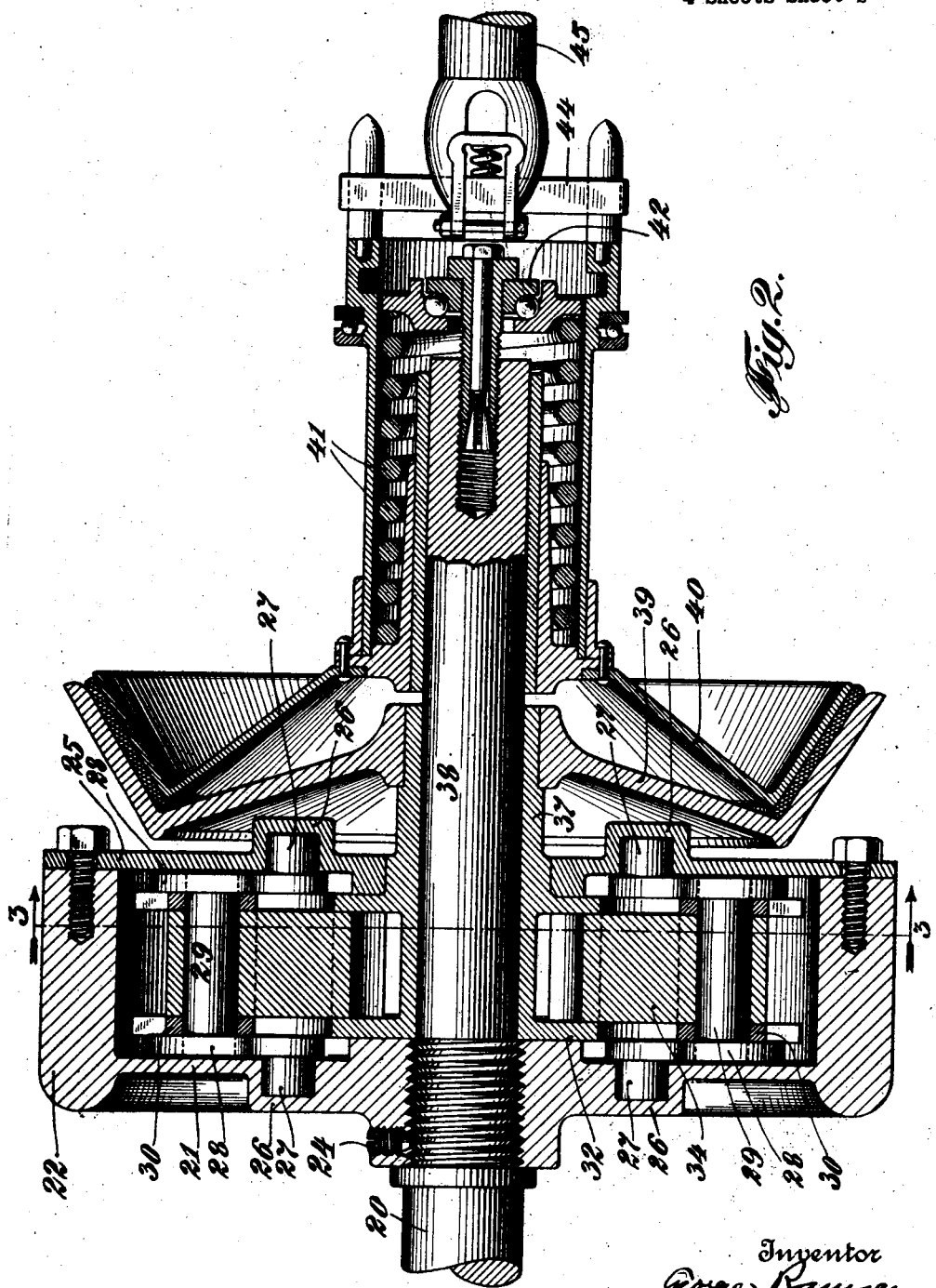
Figure 2 is a sectional view illustrating the flywheel of an engine associated with a clutch and showing a torsion friction shock-absorber, comprising a part of my invention, mounted in the flywheel.
Figure 3:
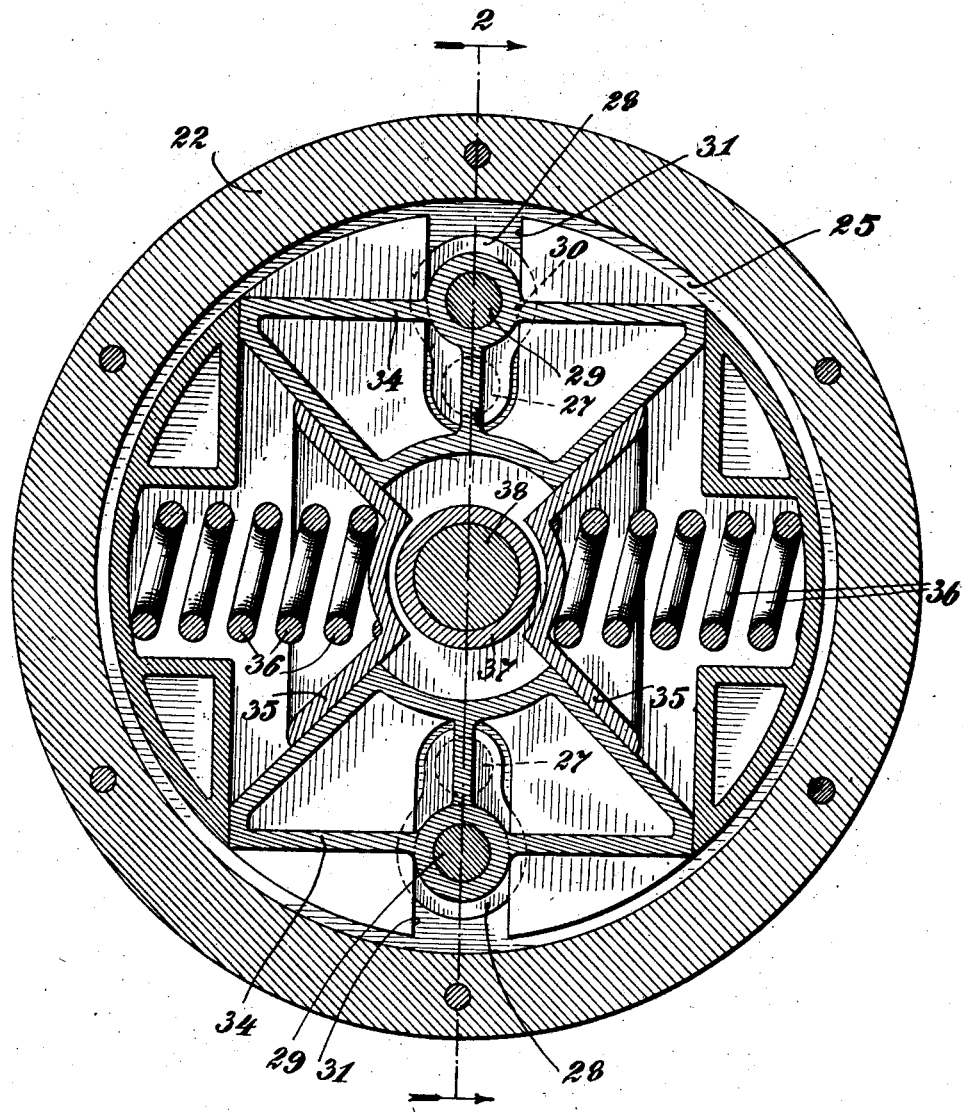
Figure 3 is a sectional view taken on line 3—3 of Figure 2.
Figure 4:
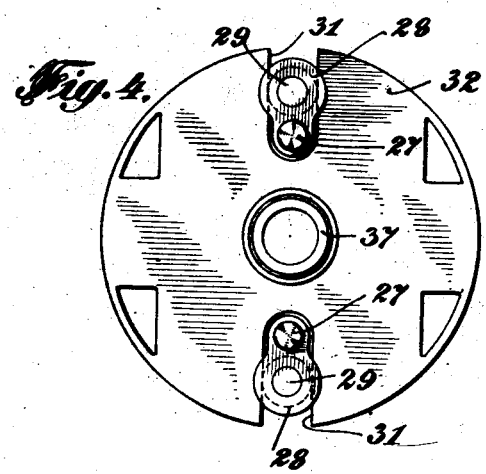
Figure 4 is a side view of the friction shock-absorbing unit removed from the flywheel.

An important element in the present invention is a torsion friction shock-absorber mounted in the line of power transmission between the prime mover and the road-wheels in such manner that all energy transmission, between the road-wheels and the chassis frame through the motor or prime mover, is transmitted through the torsion friction shock-absorber. In the present embodiment this torsion shock-absorber unit is illustrated as being mounted in the flywheel of the motor and reference is now made particularly to Figures 2, 3, and 4 of the drawings. The power shaft 20 to the engine carries a cup-shaped member 21 which is provided with a thick rim as at 22 and therefore is adapted to function as the flywheel of the engine. This flywheel member may be secured to the power shaft by being screw-threaded thereon and held in position by a stub screw 24 or other suitable connecting means. The rim 22 carries a face plate 25 which is screwed thereto by suitable stub bolts or other securing means. A member 21 and the face plate 25 are provided with recesses into which stub axles 27 of links 28 extend. These links are attached at their outer extremities to wrist pins 29. These wrist pins carry anti-friction rolls 30 which are guided in slots 31 that are positioned radially in a retaining frame 32. Friction blocks 34 are carried by the wrist pins 29 and are mounted within, to be guided by, the side walls of the retaining frame 32.

These friction blocks 34 cooperate with spring supporting blocks 35 which are urged inwardly by means of springs 36. The retaining frame 32 is provided with a tubular shaft 37 that is mounted to rotate about an extension 38 on the power shaft 20.

The tubular shaft 37 is illustrated in the present case as carrying a cup 39 of a cone clutch and a cone member 40 of the clutch is mounted to rotate upon the extension 38 of the power shaft. This cone member is normally held in engagement with the cup 39 by means of a coil spring 41 which is supported upon a ball-bearing construction 42 such as is common in the art relating to automobiles. A suitable connection 44, as is also common in the art, is provided between the clutch and a gear shaft 45, and the clutch is adaptable for operation by means of a clutch pedal 46 and the front road-wheels are adapted to be steered through a suitable steering wheel 47, all of which is common practice in the automobile art.

Referring again to Figures 2, 3, and 4, and assuming the clutch to be "in" it will be noted that the power transmitted from the power shaft 20 to the clutch cup 39 is transmitted through the torsion shock-absorbing unit. In transmitting such torsional forces the power shaft 20 tends to turn relatively to the tubular shaft 37. This turning movement carries the stub axles 27 of the links 28 forward relatively to the wrist pins 29 and the forward movement of the links causes the wrist pins to move toward the axis of the power shaft. This movement of the wrist pins is directly communicated to the friction blocks 34 and the inward movement of these blocks causes the spring-supporting blocks to move outwardly against the pressure springs 36. During this movement a considerable amount of energy is absorbed as friction between the contacting surfaces of the blocks 34 and 35. It is to be noted that the action of the device is independent of the direction of rotation of the driving shaft, that is, the device acts the same whether the driving shaft be rotated clockwise or counter-clockwise. The friction load, or friction absorption of force, is a factor which operates over and above the power of the springs and actually absorbs a certain amount of the energy which is transmitted to the device as sudden jerks or vibrations such as are developed in the operation of an automobile.

Figure 5:
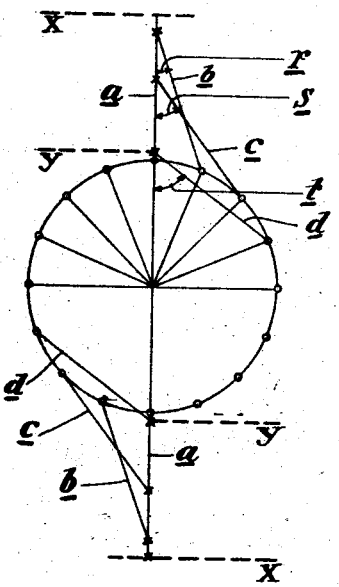
Figure 5 is a diagrammatic view illustrating the relation of parts of the friction shock-absorbing unit during its operation.
Figure 7:
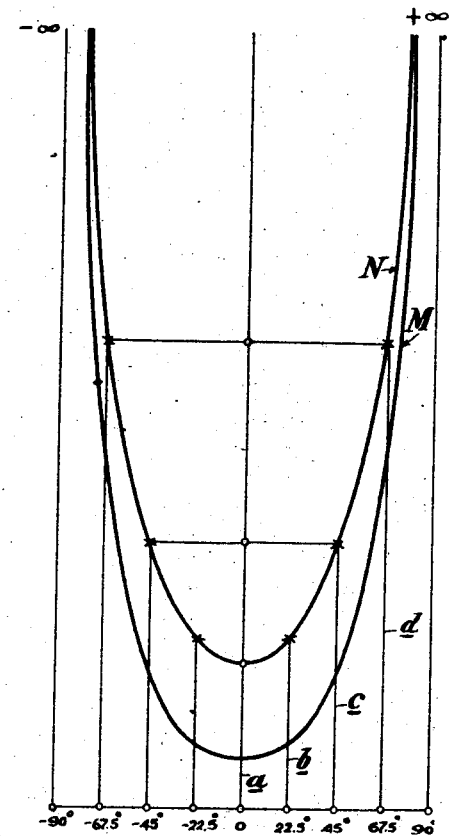
Figure 7 is a curve comprising a layout of the forces generated from the diagrammatic views 5 and 6 and illustrating the zones of action covered by the friction elements of the shock-absorber.
Figure 6:
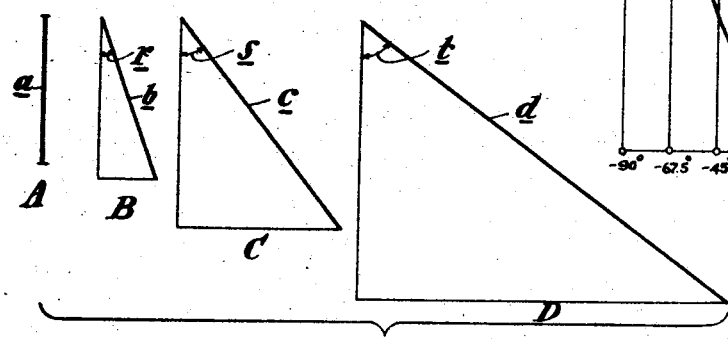
Figure 6 is a diagrammatic view showing relative increase of resistance as the angular relation increases between sections of the propulsion shaft on opposite sides of the friction torsion shock-absorbing unit.

Referring now to Figures 5, 6, and 7, it will be noted that Figure 5 is a diagram of the action of the parts for angular movement of 22½ degrees, 45 degrees, and 67½ degrees between the power shaft 20 and the tubular shaft 37. This diagram also illustrates that during such angular movement the wrist pins have moved from the position of rest X to the position Y, and that while the actual resisting forces act radially from the axis of the power shaft, the effective resistance forces act at an angle to such radii.

Figure 6 is illustrative of the increase of the resistance of the device as the angularity between the power shaft 20 and the tubular shaft 37 increases. The resistance line $a$, which represents the normal position of parts, is equivalent to the resistance of the coil springs 36 plus the resistance due to the friction between the blocks 34 and 35, and the action of the resistance is radial. Resistance line $b$ is the hypothenuse of a triangle, the vertical line of which is equal to the radial thrust outwardly on the wrist pins 29 when the links are disposed at an angle $r$ to the radial line of resistance, and when the angularity between the shaft 20 and the tubular shaft 38 is 22½ degrees. The resistance line $c$ indicates the effective resistance in a similar manner when the angularity between these shafts is 45 degrees and the angle of the links is S. The resistance line $d$ in like manner indicates the effective resistance when the angularity of the shafts is 67½ degrees and the angle at which the link operates is the angle $t$. It therefore is apparent that the resistance increases very rapidly as the angularity between the parts increases gradually.

Referring now to Figure 7 which is a chart showing the operation of the novel shock-absorber, the abscissa represents the angular displacement between the power shaft 20 and the tubular shaft 37, the ordinate represents the resistance. The lower heavy line M represents the line of resistance due to the sole action of the springs 36. The upper line N is the line of resistance due to the combined action of the springs and the friction devices. It will be noted that the area between these lines is the area covered by the friction action. Therefore it follows that any force which falls within this area will be completely absorbed by the friction element and will not be transmitted through the power shaft. This, therefore, comprises a zone of complete neutrality as far as shock is concerned and covers the area of road-wheel shocks that produce undesirable vibration. The driving torsion is transmitted without diminution after the original impulse is absorbed, which carries the absorbing devices to a point of resistance equivalent to sustaining the power transmitted.

In view of the foregoing explanation it is clear that road-wheel shocks, or shocks originating in the prime mover, which otherwise would transmit vibrations to the body of the automobile, are completely absorbed without destroying the power transmitted. Shocks due to the bouncing of the automobile body relative to the road-wheels, and which would be transmitted as horizontal vibrations, are also likewise absorbed. It therefore appears that the torsion shock-absorbing devices operate in combination with the body suspension shock-absorbing devices, and the body of the automobile is completely relieved of the shocks which otherwise would be transmitted through, or originate because of, the action between the driving power and the road-wheels. Furthermore it will be noted that the present device takes up the severe stresses which are set up in the driving mechanism when the clutch is quickly locked, as often occurs with inexperienced drivers.

Having thus described my invention, what I claim is:

1. As an article of manufacture, a friction torsional shock absorber for automobiles and the like comprising a casing, a frame rotatably mounted within the said casing, friction blocks radially movable within said frame, certain of said friction blocks being spring pressed, and means connecting said casing with certain of said friction blocks in such manner as to slide said blocks one upon another when said frame is displaced by angular movement relative to said casing.

2. As an article of manufacture, a friction torsional shock absorber for automobiles and the like comprising a casing, a frame mounted within the said casing, and rotatable on the occurrence of a torsional shock triangular friction blocks within said frame, certain of said friction blocks being spring pressed, and means connecting said casing with certain of said friction blocks and with said frame in such manner as to slide said blocks one upon another when said frame is displaced by angular movement relative to said casing.

3. As an article of manufacture, a friction torsional shock absorber for automobiles and the like comprising a casing, a frame rotatably mounted within the said casing, friction blocks within said frame, certain of said friction blocks being spring pressed, and means comprising swinging links connecting said casing with certain of said friction blocks and with said frame in such manner as to slide said blocks one upon another when said frame is displaced by angular movement relative to said casing.

4. As an article of manufacture, a friction torsional shock absorber for automobiles and the like comprising a casing, a frame rotatably mounted within the said casing, triangular friction blocks radially movable within said frame, certain of said friction blocks being spring pressed, and means comprising swinging links connecting said casing with certain of said friction blocks and with said frame in such manner as to slide said blocks one upon another when said frame is displaced by angular movement relative to said casing.

5. In an automobile and the like, a source of power, driven means, a friction torsion shock absorber comprising a casing member operatively connected with the source of power, a frame operatively connected with the driven means and having a limited rotative movement relatively to said casing, springs constructed to resist angular displacement of said frame relative to said casing, and friction means comprising triangular blocks cooperating with said springs and adapted to absorb a portion of the energy tending to displace the casing angularly relative to the frame.

6. In an automobile and the like, a source of power, driven means, a friction shock absorber comprising a casing member operatively connected with the source of power, a frame mounted within said casing and operatively connected with the driven means and having a limited rotative movement relatively to said casing, springs constructed to resist angular displacement of said frame relative to said casing, and friction means comprising triangular blocks cooperating with said springs and adapted to absorb a portion of the energy tending to displace the casing angularly relative to the frame.

7. A propeller shaft shock absorber for automobiles and the like comprising a frame member adapted to be connected to the source of power, a second frame member adapted to be connected to the driven means, springs and swing-link connections between said frame members so that the rotation of one frame member relative to the other is resisted, and friction means adapted to assist said springs to resist the rotation of one of said members relative to the other and to absorb vibratory energy being transmitted to either of said frames.

8. A propeller shaft shock absorber for automobiles and the like comprising a frame member adapted to be connected to the source of power, a second frame adapted to be connected to the driven means, springs and swing-link connections between said frame members so that the rotation of one frame member relative to the other is resisted, and friction means comprising radially movable blocks adapted to assist said springs to resist the rotation of one of said members relative to the other and to absorb vibratory forces being transmitted to either of said frames.

9. In an automobile or the like, the combination of driving means comprising an engine and a propeller shaft, a torsional friction shock absorber operatively connecting the engine with the propeller shaft, said shock absorber comprising a plurality of triangular blocks, radially acting springs normally retaining said blocks under compression, and operative means constructed to slide certain of said blocks one upon another and to compress said springs when the engine is operative upon the propulsion shaft.

10. In an automobile or the like, the combination of driving means comprising an engine and a propeller shaft, a torsional friction shock absorber operatively connecting the engine with the propeller shaft, said shock absorber comprising a plurality of triangular blocks, radially acting springs normally retaining said blocks under compression, operative means comprising radially movable stub shafts, and swinging links connected to the stub shafts and constructed to slide certain of said blocks one upon another and to compress said springs when the engine is operative upon the propulsion shaft.

GEORGE RAMSEY.